United States Patent
Schober et al.

(10) Patent No.: US 7,375,163 B2
(45) Date of Patent: May 20, 2008

(54) CEMENT ADMIXTURE FOR IMPROVED SLUMP LIFE

(75) Inventors: Irene Schober, Zürich (CH); Theodor A. Bürge, Geroldswil (CH); Ulf Velten, Zürich (CH); Jürg Widmer, Zürich (CH); Christian M. Bürge, Schafisheim (CH); Urs Mäder, Frauenfeld (CH)

(73) Assignee: Sika Technology AG, Baar (CH)

( * ) Notice: Subject to any disclaimer, the term of this patent is extended or adjusted under 35 U.S.C. 154(b) by 82 days.

(21) Appl. No.: 11/329,233

(22) Filed: Jan. 11, 2006

(65) Prior Publication Data

US 2007/0032599 A1  Feb. 8, 2007

Related U.S. Application Data

(60) Division of application No. 10/682,300, filed on Oct. 10, 2003, now Pat. No. 7,026,402, which is a continuation of application No. 09/813,996, filed on Mar. 22, 2001, now abandoned.

(30) Foreign Application Priority Data

Mar. 22, 2000 (EP) .................................. 00105910

(51) Int. Cl.
*C08F 220/66* (2006.01)

(52) U.S. Cl. ................ 525/327.6; 525/330.2; 525/379; 525/384; 526/262; 526/307.5; 526/307.6; 526/307.7

(58) Field of Classification Search ............. 525/327.6, 525/330.2, 379, 384; 526/262, 307.5, 307.6, 526/307.7
See application file for complete search history.

(56) References Cited

U.S. PATENT DOCUMENTS

| | | | |
|---|---|---|---|
| 6,087,418 A | 7/2000 | Yamashita et al. |
| 6,166,112 A | 12/2000 | Hirata et al. |
| 6,187,841 B1 | 2/2001 | Tanaka et al. |
| 6,258,162 B1 | 7/2001 | Kawakami et al. |
| 6,294,015 B1 | 9/2001 | Yamashita et al. |
| 6,376,581 B1 | 4/2002 | Tanaka et al. |

FOREIGN PATENT DOCUMENTS

| | | |
|---|---|---|
| EP | 589 256 | 3/1994 |
| FR | 2 516 913 | 5/1983 |
| JP | 11-060303 | 3/1999 |

OTHER PUBLICATIONS

Search Report issued in European Application No. EP 00 10 5910, Jul. 6, 2000.

*Primary Examiner*—Bernard Lipman
(74) *Attorney, Agent, or Firm*—Bingham McCutchen LLP

(57) ABSTRACT

Described are polymers and cement admixtures which reduce drop in fluidity with time. Said admixture comprises at least one polymer of the present invention and at least one polymer A. The polymer of the present invention comprises side chains of which at least 10 weight-% can be cleaved in alkaline medium. The polymer of the present invention is an acrylic polymer which comprises side chains connected to the backbone by ester linkages. These side chains may be alkyl, hydroxy alkyl, cycloalkyl or polyoxyalkylene groups. Polymer A is a cement dispersing agent. The combination of polymer A with the polymer of the present invention in a weight ratio of 0.1:10-10:1, and preferably 1:10-10:1 reduces the drop in fluidity with time of cementitious compositions.

23 Claims, No Drawings

CEMENT ADMIXTURE FOR IMPROVED SLUMP LIFE

CROSS REFERENCE TO RELATED APPLICATIONS

This application is a divisional of application Ser. No. 10/682,300 filed on Oct. 10 2003, now U.S. Pat. No. 7,026,402, which is a continuation of application Ser. No. 09/813,996 filed on Mar. 22, 2001, now abandoned. This application claims the priority of European patent application 00 105 910.4, filed on Mar. 22, 2000, the disclosure of which is incorporated herein by reference in its entirety.

BACKGROUND OF THE INVENTION

The present invention relates to an admixture for cementitious compositions which reduces the drop in fluidity with time.

High range water reducing admixtures, also known as superplasticisers, for cementitous compositions such as cement pastes, mortars or concretes, are quite well known and used already since the late 1960's. They improve the workability of the composition and allow a reduction of the water to cement ratio. The improvement of workability can also be attained by use of more water but this influences negatively the properties of the cementitious composition in the hardened state e.g. the tensile and compressive strengths, resistance to frost, resistance to deicing salts, waterproofness, resistance to abrasion and chemical durability. Examples for high range water reducers are salts of naphthalene sulfonic acid condensates or salts of melamine sulfonic acid condensates. These polymers suffer from the problem of drastic loss of fluidity of the cementitious composition, with time. This loss of workability is a big problem for applications where the cementitious composition like concrete, has to be transported over longer distances. Other examples of superplasticizers are copolymers of maleic acid or polyglycol esters thereof as mentioned in EP 291073, EP 373621, EP 306449, EP 850894 which all show reduced slump-loss. But maleic acid copolymers are known to suffer from the problem of strong retardation of the hardening of the cementitious composition. In the last years new superplasticisers, copolymers of (meth)acrylic acid with polyalkyleneoxide side chains, so called comb polymers, were developed which have very high water reduction. But if this water reduction of more than 20% is realised, the composition suffers from slump-loss e.g. loss of fluidity with time.

In view of the foregoing disadvantages of the prior art a novel admixture for cementitious compositions is needed which reduces the drop in fluidity of superplasticised cement pastes, mortars or concretes.

BRIEF SUMMARY OF THE INVENTION

Hence, it is a general object of this invention to provide a polymer and an admixture comprising same for cementitious compositions which reduce the drop in fluidity (called slump-loss) with time without excessive retardation of the hardening. The present invention is based on the discovery that the aforementioned problems can be solved by use of a polymer, and preferably an admixture comprising said polymer (also referred to as polymer B) and at least one further polymer, designated polymer A, wherein the polymer B of the present invention comprises side chains of which at least 10 weight-% can be cleaved in alkaline medium at a pH of from 8-14. This polymer, and in particular the admixture, can drasticly reduce the slump loss of cementitious compositions.

The polymer of the present invention comprises a mole-% of structural unit A of formula I

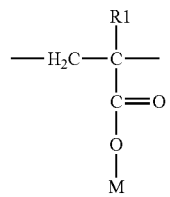

b mole-% of structrural unit B of formula II

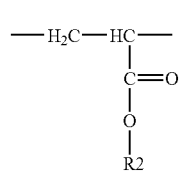

c mole-% of structural unit C of formula III

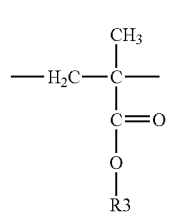

d mole-% of structural unit D of formula IV

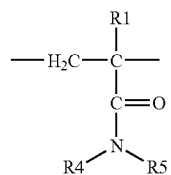

and e mole-% of structural unit E of formula V

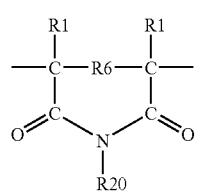

wherein each R1 independently from each other represents a hydrogen atom or a methyl group or mixtures thereof (wherever the expression "mixtures thereof" occurs in connection with the specification of substituents, it means that structural units of a specific kind with a specific substituent can be present simultaneously with one or more other structural units of the same kind but with other specific substituents, and/or that, where one structural unit comprises several substituents identically designated, said substituents can have different meanings in one and the same structural unit);

M represents a hydrogen atom, a metallic cation, an ammonium or organic ammonium cation (such as e.g. alkyl and/or alkanol substituted cations with at least one such substituent, in particular $C_1$ to $C_4$ alkyl and/or $C_1$ to $C_4$ alkanol substituted ammonium cations) or mixtures thereof;

R2, R20 and R3 independently from each other represent a $C_1$-$C_{12}$ alkyl- or cycloalkyl group, a $C_2$-$C_{12}$ hydroxyalkyl group or $(R7O)_zR8$ in which O represents an oxygen atom, R7 represents a $C_2$-$C_3$ alkylene group or mixtures thereof, R8 represents a hydrogen atom, a $C_1$-$C_{12}$ alkyl- or cycloalkyl group, a $C_2$-$C_{12}$ hydroxyalkyl group, or an unsubstituted or substituted aryl group and z represents a number from 1-250; whereby R2, R3 and R20 may be mixtures thereof, R4 and R5 represent independently from each other a hydrogen atom or a substituent as defined for R2, and R4 and R5 may form together a ring structure of which N is part of, this ring structure may further contain other hetero atoms like another nitrogen, sulfur or oxygen atom, or mixtures thereof;

R6 is a single bond or a methylene group, a, b, c, d and e represent numbers where the sum of a+b+c+d+e=100 and b is a number from 10-90, c is a number from 0-85, d is a number from 0-50 and e is a number from 0-10 and a is 100−(b+c+d+e), whereby a is at least 5.

In one preferred embodiment of the present invention, the sum of e and d is preferably a value of more than 0, more preferably between 0.01 and 50, most preferably between 0.01 and 2.

Another preferred embodiment of the present invention comprises a polymer as defined above in which at least 0.5 mole-%, more preferred 5-100 mole-% and most preferred 50-100 mole-% of the residues R2 of structural units B of formula II are $—(R^7O)_zR^8$ with $R^7$, z and $R^8$ as defined above.

Polymer B as defined above may contain side chains of formula VI which are connected to the backbone by amide or ester groups.

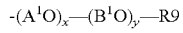

-(A¹O)ₓ—(B¹O)ᵧ—R9         VI wherein O represents an oxygen atom and $A^1$ and $B^1$ represent independently from each other a $C_2$-$C_3$ alkylene group and $A^1 \neq B^1$ and R9 represents a hydrogen atom, a $C_1$-$C_{12}$ alkyl- or cycloalkyl group, a $C_2$-$C_{12}$ hydroxyalkyl group, or an unsubstituted or substituted aryl group and x represents a number from 1-250 and y represents a number from 0-250 and the sum of x and y is a number of 1-250 and the order ($A^1O$) and ($B^1O$) is random, alternating or blockwise.

The amount of these side chains of formula VI in the polymer is preferably greater than 0.5 weight-% more preferred 5-99 weight-% and most preferred 50-99 weight-% of the polymer.

Polymer A is a cement dispersing admixture preferably of the group consisting of sulfonated melamine condensates, sulfonated naphthalene condensates, lignosulfonates, substituted maleamid-vinyl-copolymers and acrylic or methacrylic copolymers with polyalkyleneoxide side chains, or mixtures thereof.

The solid weight ratio of polymers A to the polymers of the present invention usually is from 0.1:10-10:1 and preferably from 1:10-10:1.

To enhance the effect already obtainable with the polymer of the present invention alone, polymer A and the polymer of the present invention may be used together, either combined in one admixture or they can be added separately to the cementitious composition.

DETAILED DESCRIPTION OF THE INVENTION

This invention relates to a polymer and an admixture comprising at least one polymer A and at least one polymer of the present invention, whereby the polymer of the present invention comprises side chains of which at least 10 weight-% can be cleaved in alkaline medium at a pH of from 8-14. This polymer, and in particular said admixture can drastically reduce the slump-loss of cementitious compositions.

The side chains of the polymer of the present invention may be connected to the backbone by ester linkages. Said polymer may further contain side chains, which are connected to the backbone by amide groups. Side chains which are cleavable in alkaline medium are e.g. ester linkages like in polymerised acrylic esters. Not cleavable in the aforementioned manner are esters like in polymerised methacrylic esters. Furthermore side chains which are connected to the backbone by amide or imide linkages are not considered as cleavable in the idea of this patent.

The polymer of the present invention comprises a mole-% of structural unit A of formula I

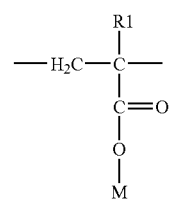

b mole-% of structrural unit B of formula II

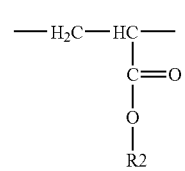

c mole-% of structural unit C of formula III

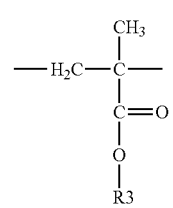

d mole-% of structural unit D of formula IV and

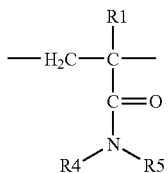

e mole-% of structural unit E of formula V

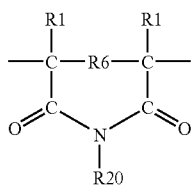

wherein each R1 independently from each other represents a hydrogen atom or a methyl group or mixtures thereof;

M represents a hydrogen atom, a metallic cation, an ammonium or organic ammonium cation (such as e.g. alkyl and/or alkanol substituted cations with at least one such substituent, in particular $C_1$ to $C_4$ alkyl and/or $C_1$ to $C_4$ alkanol substituted ammonium cations) or mixtures thereof;

R2, R20 and R3 independently from each other represent a $C_1$-$C_{12}$ alkyl- or cycloalkyl group, a $C_2$-$C_{12}$ hydroxyalkyl group or $(R7O)_zR8$ in which O represents an oxygen atom, R7 represents a $C_2$-$C_3$ alkylene group or mixtures thereof, R8 represents a hydrogen atom, a $C_1$-$C_{12}$ alkyl- or cycloalkyl group, a $C_2$-$C_{12}$ hydroxyalkyl group, or an unsubstituted or substituted aryl group and z represents a number from 1-250, whereby R2, R3 and R20 may be mixtures thereof;

R4 and R5 represent independently from each other a hydrogen atom or a substituent as defined for R2, and R4 and R5 may form together a ring structure of which N is part of, this ring structure may further contain other hetero atoms like another nitrogen, sulfur or oxygen atom, or mixtures thereof;

R6 is single bond or a methylene group, a, b, c, d and e represent numbers where the sum of a+b+c+d+e=100 and b is a number from 10-90, c is a number from 0-85, d is a number from 0-50 and e is a number from 0-10 and a is 100−(b+c+d+e), whereby a is at least 5.

In one preferred embodiment of the present invention the sum of e and d is preferably a value of more than 0, more preferably between 0.01 and 50, most preferably between 0.01 and 2.

Another preferred embodiment of the present invention comprises a polymer as defined above in which at least 0.5 mole-%, more preferred 5-100 mole-% and most preferred 50-100 mole-% of the residues R2 of structural units B of formula II are $-(R^7O)_zR^8$ with $R^7$, z and $R^8$ as defined above.

The polymer of the present invention, as defined above, may contain side chains of formula VI which are connected to the backbone by amide or ester groups.

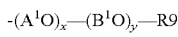

In formula VI O represents an oxygen atom and $A^1$ and $B^1$ represent independently from each other a $C_2$-$C_3$ alkylene group and $A^1 \neq B^1$ and R9 represents a hydrogen atom, a $C_1$-$C_{12}$ alkyl- or cycloalkyl group, a $C_2$-$C_{12}$ hydroxyalkyl group, or an unsubstituted or substituted aryl group and x represents a number from 1-250 and y represents a number from 0-250 and the sum of x and y is a number of 1-250 and the order ($A^1O$) and ($B^1O$) is random, alternating or blockwise.

The amount of these side chains of formula VI in the polymer is preferably greater than 0.5 weight-% more preferred 5-99 weight-% and most preferred 50-99 weight-% of the polymer.

The inventive polymer comprises 5-90 mole-% more preferably 20-80 mole-% of structural unit A of formula I and 10-90 mole-% more preferably 15-70 mole-% of structural unit B of formula II and 0-85 mole-% of structural unit C of formula III and 0-50 mole-% more preferably 0-20 mole-% of structural unit D of formula IV and 0-10 mole-% of structural unit E of formula V.

The polymer of the present invention as defined above may be produced by copolymerisation reactions as described in standard literature. The monomers resulting in structural unit A of formula I in said polymer are selected from the group comprising acrylic acid and methacrylic acid which may be fully or partly neutralised before or after the polymerisation with an alkaline substance. Examples for this alkaline substance are metal hydroxides like alkali metal and alkaline earth metal hydroxides, aluminum hydroxid or oxide hydroxide, tin or zinc compounds, ammonia, alkyl amines or hydroxyalkyl amines.

The monomers resulting in structural unit B of formula II in the polymer B are acrylic esters. Examples, but not exclusive, of the acrylic esters are $C_1$-$C_{12}$ alkyl or cylcoalkyl acrylates, $C_2$-$C_{12}$ hydroxyalkyl acrylates or hydroxy or alkyl terminated polyalkyleneglycole acrylates as shown in formula VII

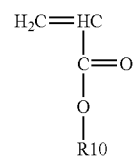

with R10 representing a polyalkyleneglycole chain shown in formula VIII

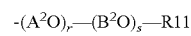

wherein O represents an oxygen atom and $A^2$ and $B^2$ represent independently from each other a $C_2$-$C_3$ alkylene group and $A^2 \neq B^2$ and R11 represents a hydrogen atom, a $C_1$-$C_{12}$ alkyl- or cycloalkyl group, a $C_2$-$C_{12}$ hydroxyalkyl group, or an unsubstituted or substituted aryl group and r represents a number from 1-250 and s represents a number from 0-250 and the sum of r and s is a number of 1-250 and the order ($A^2O$) and ($B^2O$) is random, alternating or blockwise.

Monomers VII with different R10 may be used in combinations with each other.

The monomers resulting in structural unit C of formula III in the polymer of the present invention are methacrylic esters. Examples but not exclusive, of these methacrylic esters are $C_1$-$C_{12}$ alkyl or cylcoalkyl methacrylates, $C_2$-$C_{12}$ hydroxyalkyl methacrylates, or alkyl terminated polyalkyleneglycole methacrylates as shown in formula IX

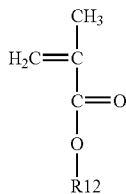

IX with R12 representing a polyalkyleneglycol chain shown in formula X

-(A³O)$_t$—(B³O)$_u$—R13    X wherein O represents an oxygen atom and A³ and B³ represent independently from each other a $C_2$-$C_3$ alkylene group and A³≠B³, and R13 represents a hydrogen atom, a $C_1$-$C_{12}$ alkyl- or cycloalkyl group, a $C_2$-$C_{12}$ hydroxyalkyl group, or an unsubstituted or substituted aryl group and t represents a number from 1-250 and u represents a number from 0-250 and the sum of t and u is a number of 1-250 and the order (A³O) and (B³O) is random, alternating or blockwise.

Monomers IX with different R12 may be used in combinations with each other.

The monomers resulting in structural unit D of formula IV in the polymer of the present invention are acrylamides or methacrylamides or N-substituted acrylamides or methacrylamides. Examples, but not exclusive, of these methacrylic amides are methoxypolyalkyleneglycole acrylamides, methoxypolyalkyleneglycole methacrylamides, acryl or methacrylamides of dicylcohexylamine, acryl or methacrylamides of oxazolidine.

The polymerisation of the mentioned monomers may be carried out in bulk or in solution, initiated by a polymerisation initiator. Further chain transfer agents and redox-initiator systems may be used.

The inventive polymers as defined above may be produced by reacting a polycarboxylic acid or a $C_1$-$C_5$-ester thereof or a partly neutralised polycarboxylic acid, having all a number average molecular weight of from 500 to 20'000 with a monofunctional polyalkyleneglycol-monoalkylether, represented by formula XI HO-(A⁴O)$_v$—(B⁴O)$_w$—R14    XI and optionally a monofunctional α-amino-polyalkyleneglycol-ω-alkylether, represented by formula XII H$_2$N-(A⁵O)$_m$—(B⁵O)$_n$R15    XII and/or, optionally a primary or secondary amine, represented by formula XIII

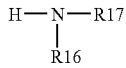

XIII wherein O represents an oxygen atom and A⁴, A⁵, B⁴ and B⁵ represent independently from each other a $C_2$-$C_3$ alkylene group and A⁴≠B⁴ and A⁵≠B⁵. R14 and R15 independentyl represent a hydrogen atom or a $C_1$-$C_4$ alkyl group and v and m represent a number from 1-250 and w and n represent a number from 0-250 and the sum of v and w and the sum of m and n is a number of 1-250 and the order (A⁴O) and (B⁴O) respectively of (A⁵O) and (B⁵O) is random, alternating or blockwise.

R16 and R17 independently from each other represent a hydrogen atom or an $C_1$-$C_4$ alkyl group, or oxyalkylen groups of the structure R18—(O—R19)$_p$—, where R18 independently represents a $C_1$-$C_4$ alkyl rest and R19 independently represents a $C_2$-$C_3$ alkylene group or a mixture thereof, wherein the mixture may be formed by either random, alternating or block addition, R16 and R17 represent also cyclic derivatives such as aliphatic $C_3$-$C_8$ rings, and R16 and R17 together may form a heterocyclic ring structure wherein N is a part of. This heterocyclic ring may contain in addition to the N atom further N, S or O atoms.

Examples, but not limiting, for polycarboxylic acids which can be used for the production of the polymer of the present invention are polyacrylic acid, copolymers of acrylic acid with methacrylic acid, homo or copolymers of acrylic $C_1$-$C_5$-esters, or copolymers of methacrylic acid with $C_1$-$C_5$ acrylic esters. The term polyacarboxylic acid further comprises also partly neutralised polymers.

Part of the side chains in the inventive polymer is cleaved in alkaline medium.

As alkaline medium a medium is meant, which may be an aqueous liquid, paste, slurry, emulsion or a dispersion of a pH from 8-14.

Example for an alkaline medium is the liquid phase of a cement slurry.

The admixture for preventing drop in fluidity of cementitious admixtures of this invention contains besides the inventive polymer a polymer A which is a cement dispersing agent preferably of the group consisting of sulfonated melamine condensates, sulfonated naphthalene condensates, lignosulfonates, substituted maleamid-vinyl-copolymers and acrylic or methacrylic copolymers with polyalkyleneoxide side chains, or mixtures thereof.

A preferred admixture for example comprises a polymer of the present invention consisting of 40-80 mole-% of structural unit A of formula I, 20-70 mole-% of structural unit B of formula II, 0-50 mole-% of structural unit C of formula III, 0-20 mole-% of structural unit D of formula IV and 0-5 mole-% of structural unit E of formula V and polymer A is a copolymer of (meth)acrylic acid with polyalkyleneoxide methacrylate.

The solid weight ratio of polymers A to the polymers of the present invention usually is from 0.1:10-10:1 and preferably from 1:10-10:1.

The addition of polymer A and the inventive polymer to the cementitious composition may be in solid form or as liquid admixture or in an adsorbed form on a powder material. The addition of said two polymers can be performed combined in one admixture or they can be added separately to the cementitious composition. Polymer A and the polymer of the present invention may furthermore be added at the same time or at different times to the cementitious composition.

The cementitous composition according to the present invention comprises cement, the polymer or cement admixture of the present invention and water and is, for example used as cement paste, mortar or concrete. Examples of cement which can be used include many kinds of Portland cement like ordinary Portland cement, high early strength or moderate heat Portland cement, white cement, blended cements which contain fly ash, slag, puzzolanic materials, carbonaceous materials, silica fume, burnt oil shale, metakaolin or gypsum.

The cement composition of the present invention may further comprise conventional admixtures like plasticisers, superplasticisers, air entraining admixtures, defoamers, retarders, set accelerators, hardening accelerators, hydrophobising or shrinkage reducing admixtures or corrosion inhibitors.

PRODUCTION EXAMPLES

The following examples describe the synthesis of the polymer of the invention.

Example 2-5

For Producing Polymer E2-E5

The polymers are produced in the same manner as described in example 1. The monomers used and their dosages in grams are listed in table 1.

Comparison Examples 1-3

For Producing Polymer C1-C3

The polymers are produced in the same manner as described in example 1. The monomers used and their dosages in grams are listed in table 1.

TABLE 1

| Example | AS | MAS | PEO 6A | MPEO 11A | MPEO 1000MA | MPEO 2000MA | SPS | SDS | Total water | NaOH 50% |
|---|---|---|---|---|---|---|---|---|---|---|
| Polymer E2 | 18.0 |  | 110.7 |  |  |  | 9.0 | 6.7 | 239 | 12.3 |
| Polymer E3 | 18.0 |  |  | 172.0 |  |  | 8.5 | 6.3 | 353 | 18.8 |
| Polymer E4 |  | 43.0 | 133.0 |  | 106.8 |  | 17.2 | 12.4 | 525 | 18.2 |
| Polymer E5 | 36.0 |  | 133.0 |  |  | 208.0 | 11.4 | 8.0 | 700 | 22.0 |
| Polymer C1 |  | 34.5 |  |  |  | 165 | 8.2 | 5.9 | 370 | 33.5 |
| Polymer C2 |  | 17.2 | 26.5 |  | 106.8 |  | 5.9 | 4.2 | 280 | 6.3 |
| Polymer C3 |  | 25.8 |  |  | 106.8 |  | 6.9 | 4.9 | 246 | 23.1 |

AS acrylic acid
MAS methacrylic acid
PEO 6A hydroxy polyethyleneglycol acrylate with 6 units of ethyleneglycol
MPEO 11A methoxy polyethyleneglycol acrylate with 11 units of ethyleneglycol
MPEO 1000MA, MPEO 2000MA methoxy polyethyleneglycol methacrylate with mol. weight of the polyethyleneglycol chain of 1000 resp. 2000
SPS sodium persulfate
SDS sodium disulfit It is clear for the averagely skilled person that, if polyalkylene oxides or their derivatives are used, the number of alkylene oxide units is a mean value of a molecular number distribution and the mentioned molecular weights are the mean molecular weights of the used polymer.

Example 1

For Producing Polymer E1

A one liter reactor, equipped with a mechanical stirrer, a dropping funnel, a reflux condenser, a thermometer and two inlet tubes was charged with 308 g deionized water.

A monomer solution was prepared of 32.4 g acrylic acid, 57 g of a methoxy polyethyleneglycol acrylate with 11 units of ethyleneglycol, 160 g of a polyethyleneglycol methacrylate with 23 units of ethyleneglycol and 110 ml deionized water and filled in the dropping funnel.

A solution A was prepared of 10.8 g sodium persulfate in 40 g deionized water. A solution B was prepared of 8.0 g sodium disulfit in 40 g deionized water.

The reactor was heated and at a temperature of the water of 80° C. the monomer solution was added from the dropping funnel and the solutions A and B were added separately with a tube-pump within 4 hours at 80° C.

After the addtions the mixture was stirred at 80° C. until the peroxide test was negative. After cooling to room temperature, the pH of the polymer solution was adapted to 5 by addition of 22.7 g 50% sodium hydroxide solution.

Example 6

For Producing Polymer E6

160 g of a 50% aqueous solution of a 4000 molecular weight poly(acrylic acid) and 7.5 g 50 wt. % sulfuric acid were placed in a glass reactor fitted with a thermometer, a stirrer, a gas inlet tube and a distillation assembly. The solution was heated to 70° C. and 140 g of a 350 number average molecular weight polyethyleneglycol-monomethylether and 200 g of a 2000 number average molecular weight α-amino-polyethylene-glycol-ω-methylether were added.

The mixture was heated up under a steady stream of nitrogen and kept at 165° C. After 6 h stirring at 165° C. the mixture was cooled down. At 90° C. 630 g water were added.

Examples 7-14

For Producing Polymers E7-E14

The polymers were produced in the same manner as described in example 6 but with the amounts of reactants in grams listed in table 2.

TABLE 2

All values in grams (except time in hours and minutes)

| Example | PAS 4000 | SS 50% | PEG 350MME | PEG 500MME | PEG 1000MME | A-PEG 500MME | A-PEG 2000MME | Reaction Time at 165° C. (hh:mm) |
|---|---|---|---|---|---|---|---|---|
| Polymer E7 | 160 | 7.5 | 0 | 175 | 0 | 26 | 0 | 7:30 |
| Polymer E8 | 160 | 7.5 | 123 | 0 | 0 | 100 | 0 | 4:00 |
| Polymer E9 | 160 | 7.5 | 0 | 0 | 400 | 0 | 0 | 7:00 |
| Polymer E10 | 160 | 7.5 | 0 | 0 | 300 | 52 | 0 | 6:00 |
| Polymer E11 | 160 | 7.5 | 0 | 0 | 380 | 10 | 0 | 6:00 |
| Polymer E12 | 160 | 7.5 | 123 | 0 | 0 | 0 | 100 | 7:00 |
| Polymer E13 | 160 | 5.0 | 200 | 0 | 0 | 0 | 0 | 3:00 |
| Polymer E14 | 160 | 7.5 | | | 350 | 26 | 0 | 6:00 |

PAS 4000: 50% aqueous solution of a 4000 molecular weight poly(acrylic acid)
SS 50%: sulfuric acid 50 wt % in water
PEG 350MME: polyethyleneglycol-monomethylether of average molecular weight of 350
PEG 500MME: polyethyleneglycol-monomethylether of average molecular weight of 500
PEG 1000MME: polyethyleneglycol-monomethylether of average molecular weight of 1000
A-PEG 500MME: alpha-amino-polyethyleneglycol-omega-methylether of average molecular weight of 500
A-PEG 2000MME: alpha-amino-polyethyleneglycol-omega-methylether of average molecular weight of 2000

Cleavage of Side Chains of Polymers in Alkaline Medium

To follow the cleavage of side chains of polymer B in alkaline medium the HPLC was used to measure the amount of free polyalkyleneglycol in the solution.

Preparation of the alkaline solution:

100 g water and 100 g normal Portland cement were blended for 30 minutes and the solution was filtered off with the aid of a paper filter.

The alkaline solution had a pH of 12.9 and corresponds to the solution of a cementitious composition with a water/cement ratio of 1.0.

Side chain stability:

1.0 g of polymer with 40% solids content was dissolved in 100 ml of the aforementioned alkaline solution and analysed by HPLC technique.

The amount of polyalkylene glycole in the solution was measured at different times.

The results are listed in table 3. The percentage of cleaved side chains means, the g of side chains that have been cleaved off the main chain per 100 g of all side chains.

TABLE 3

| Polymer | Weight % side chains in polymer | Weight % of side chains cleaved after 40 min | Weight % of side chains cleaved after 2 hours | Weight % side chains cleaved after 24 hours |
|---|---|---|---|---|
| Polymer E1 | 80 | 16 | 20 | 25 |
| Polymer E2 | 71 | 39 | 50 | 56 |
| Polymer E3 | 79 | 41 | 43 | 76 |
| Polymer E6 | 81 | 13 | 16 | 34 |
| Polymer E7 | 72 | 22 | 31 | 66 |
| Polymer E13 | 71 | 34 | 52 | 90 |
| Polymer E14 | 83 | 21 | 37 | 93 |
| Polymer C3 | 75 | 0 | 0 | 0 |
| Polymer C2 | 81 | 4 | 4 | 4 |

Application Tests

Mortar Tests

Materials Used

| | |
|---|---|
| Normal Portland cement type I | 750 g |
| carbonateous filler | 150 g |
| fine sand 0-1.2 mm | 950 g |
| sand 1.2-4 mm | 800 g |
| sand 4-8 mm | 1250 g |

Mixing Procedure

Filler, sand and cement were blended in a Hobart type mortar mixer for 60 seconds, the water containing the admixtures was added and the mortar mechanically kneaded for 3 minutes.

Measurement of Plasticity

Flow table spread (a measure of the flowability of the mortar) was measured according German Standard DIN 18555 part 2 using the equipment described in German Standard DIN 1060 part 3. The measurement was repeated after 30 and 60 minutes with 30 seconds mixing of the mortar. The decrease of the flow with time is a measure of the loss of fluidity of the mortar.

Results

Results of the mortar tests of the inventive admixtures and comparison admixtures is summarised in table 4.

Polymers A in Table 4:

Polymer A1 is a modified maleamide-vinyl-copolymer;

Polymers A2, and A3 are copolymers of methacrylic acid with methacrylic ester of methylpolyethyleneglycol.

The W/C ratio is the weight of the cement divided by the weight of the water.

All admixtures were used as 35% solutions.

If necessary, the polymer solutions were defoamed with 0.2% triisobuty-phosphate.

TABLE 4

| Polymer A | Polymer of the invention | Dosage % on cement | W/C | Flow Table Spread (mm) 0 min | after 30 min | after 60 min |
|---|---|---|---|---|---|---|
| Polymer A1 | — | 1.0 | 0.44 | 190 | 167 | 144 |
| Polymer A1 | Polymer E3 | 0.7/0.7 | 0.44 | 182 | 170 | 173 |
| Polymer A1 | Polymer E14 | 0.6/0.6 | 0.44 | 190 | 189 | 176 |
| Polymer A1 | Polymer C3 | 0.8/0.2 | 0.44 | 212 | 157 | 142 |
| Polymer A2 | — | 1.0 | 0.40 | 186 | 163 | 157 |
| Polymer A2 | Polymer E7 | 0.25/0.75 | 0.40 | 184 | 190 | 176 |
| Polymer A2 | Polymer E6 | 0.7/0.5 | 0.40 | 180 | 173 | 171 |
| Polymer A2 | Polymer C1 | 0.5/0.5 | 0.40 | 164 | 148 | 143 |
| Polymer A2 | Polymer C2 | 0.75/0.25 | 0.40 | 168 | 163 | 136 |
| Polymer A3 | — | 1.0 | 0.41 | 187 | 143 | 141 |
| Polymer A3 | Polymer E3 | 0.8/0.2 | 0.41 | 207 | 208 | 187 |
| Polymer A3 | Polymer E1 | 0.4/0.5 | 0.41 | 186 | 176 | 174 |
| Polymer A3 | Polymer E13 | 0.7/1.1 | 0.41 | 176 | 167 | 170 |

The results of the mortar tests listed in table 4 show clearly the reduction of slump-loss by using polymer A and the polymer of the present invention together.

Concrete Tests

Materials Used

| Normal Portland Cement type I | 7.5 kg |
|---|---|
| Lime stone filler | 1.5 kg |
| Sand 0-1.2 mm | 9.5 kg |
| Sand 1.2-4.0 mm | 8.0 kg |
| Sand 4.0-8.0 mm | 4.5 kg |
| Gravel 8-16 mm | 9.5 kg |
| Gravel 16-32 mm | 17.0 kg |

Sand and gravel washed and dried

Measurement of Plasticity in Concrete

Cement and aggregates were premixed for 30 seconds in a 50 liter forced circulation mixer for concrete. The mixing water including the admixture was added under stirring within 20 seconds and the concrete mixed for additional 40 seconds. A part of the fresh concrete was immediately used for measuring the flow table spread according DIN 1048 part 1. The remaining concrete was left in the mixer and the flow table spread again measured after 30 and 60 minutes where the concrete was remixed for 10 seconds.

The results of the tests are summarised in table 5.

Polymers A in Table 5:

Polymers A1 and A5 are modified maleamide-vinyl-copolymers.

Polymers A3 and A4 are copolymers of methacrylic acid with methacrylic ester of methylpolyethyleneglycol.

The W/C ratio is the weight of the cement divided by the weight of the water.

The dosage of the admixtures is in weight % of 40% solutions on cement.

If necessary, the admixtures were defoamed with 0.2% triisobutyl phosphate.

The effect of the inventive admixture comprising polymer A and the polymer of the present invention on the slumplife without drastically reduction of the early strength of the concrete is clearly shown in table 5.

TABLE 5

| Polymer A | Polymer of the present invention | Dosage % on cement | W/C | Flow Table Spread (cm) 0 min | after 30 min | after 60 min | Compressive strength after 24 hours (N/mm2) |
|---|---|---|---|---|---|---|---|
| Polymer A1 | — | 0.6 | 0.47 | 58 | 42 | 39 | 20.8 |
| Polymer A1 | Polymer E14 | 0.3/0.4 | 0.47 | 47 | 51 | 51 | 18.1 |
| Polymer A3* | — | 0.8 | 0.45 | 56 | 49 | 47 | 25.6 |
| Polymer A3* | Polymer E14 | 0.64/0.16 | 0.45 | 55 | 52 | 49 | 22.3 |
| Polymer A3 | Polymer E14 | 0.48/0.32 | 0.45 | 53 | 53 | 53 | 22.2 |
| Polymer A4 | — | 0.70 | 0.41 | 51 | 47 | 42 | 30.3 |
| Polymer A4 | Polymer E14 | 0.56/0.16 | 0.41 | 51 | 48 | 46 | 30.2 |
| Polymer A4 | Polymer E14 | 0.35/0.40 | 0.41 | 49 | 49 | 48 | 28.9 |
| Polymer A5 | — | 0.6 | 0.45 | 44 | 36 | 33 | 23.1 |
| Polymer A5 | Polymer E14 | 0.30/0.40 | 0.45 | 42 | 42 | 40 | 23.6 |

While there are shown and described presently preferred embodiments of the invention, it is to be distinctly understood that the invention is not limited thereto but may be otherwise variously embodied and practised within the scope of the following claims.

The invention claimed is:

1. A polymer comprising side chains of which at least 10 weight-% can be cleaved in alkaline medium at a pH of from 8-14 at 20° C., said side chains being connected to the backbone of said polymer by ester and optionally amide and/or imide groups, whereby said polymer comprises:

a mol % of structural unit A of formula (I)

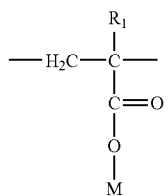

I b mol % of structural unit B of formula (II)

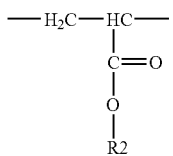

c mol % of structural unit C of formula (III)

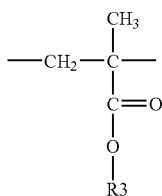

d mol % of structural unit D of formula (IV) and

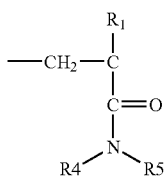

e mol % of structural unit E of formula (V)

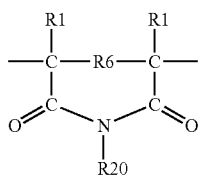

wherein each R1 independently from each other represents a hydrogen atom or a methyl group or mixtures thereof;

M represents a hydrogen atom, a metallic cation, an ammonium or organic ammonium cation or mixture thereof;

R2, R20 and R3 independently from each other represent a $C_1$-$C_{12}$ alkyl- or cycloalkyl group, a $C_2$-$C_{12}$ hydroxyalkyl group or $(R7O)_zR8$, or mixtures thereof, wherein O represents an oxygen atom, R7 represents a $C_2$-$C_3$ alkylene group or mixtures thereof, R8 represents a hydrogen atom, a $C_{1-12}$ alkyl- or cycloalkyl group, a $C_2$-$C_{12}$ hydroxyalkyl group, or an unsubstituted or substituted aryl group, and z represents a number from 1-250;

at least one of R4 and R5 represent independently from each other a hydrogen atom or a substituent as defined for R2, and R4 and R5 may form together a ring structure of which N is part of, this ring structure may further contain other hetero atoms like another nitrogen, sulfur or oxygen atom, or mixtures thereof, and wherein at least one of R4 and R5 represents $(R7O)_zR8$, where O represents an oxygen atom, R7 represents a C2-C3 alkylene group or mixtures thereof, R8 represents a hydrogen atom, a $C_{1-12}$ alkyl- or cycloalkyl group, a $C_2$-$C_{12}$ hydroxyalkyl group, or an unsubstituted or substituted aryl group, and z represents a number from 1-250;

R6 is a single bond or a methylene group, a, b, c, d and e represent numbers where the sum of a+b+c+d+e=100 and b is a number from 10-90, c is a number from 0-85, d is a number from 0-50 and e is a number from 0-10 and a is 100−(b+c+d+e), whereby a is at least 5, and wherein the sum of e and d is a value of more than 0.

2. A polymer according to claim 1, wherein the sum of e and d is between 0.01 and 50.

3. A polymer according to claim 2, where in the sum of e and d is between 0.01 and 2.

4. A polymer according to claim 1 that contains side chains of formula (VI) which are connected to the backbone by amide or ester groups,

and wherein O represents an oxygen atom and $A^1$ and $B^1$ represent independently from each other a $C_2$-$C_3$ alkylene group and $A^1 \neq B^1$; and R9 represents a hydrogen atom, a $C_1$-$C_{12}$ alkyl- or cycloalkyl group, a $C_2$-$C_{12}$ hydroxyalkyl group, or an unsubstituted or substituted aryl group and x represents a number from 1-250 and y represents a number from 0-250 and the sum of x and y is a number of 1-250 and the order (A'O) and (B'O) is random, alternating or blockwise, and wherein said side chains of formula (VI) are present in an amount of more than 0.5 weight-% of the polymer.

5. A polymer according to claim 4, wherein said side chains of formula (VI) are present in an amount of from 5-99 weight-%.

6. A polymer according to claim 4, wherein said side chains of formula (VI) are present in an amount of from 50-99 weight-%.

7. A polymer according to claim 1 obtainable or produced by a copolymerizing reaction of (meth)acrylic monomers.

8. A polymer according to claim 1 obtainable or produced by polymer analogous reaction of esterification, with or without amidation and/or imidation of a polycarboxylic acid.

9. A polymer according to claim 1 comprising 5-90 mol % of structural unit A of formula (I); 10-90 mol % of structural unit B of formula (II); 0-85 mol % of structural unit C of formula (III); 0-50 mol % of structural unit D of formula (IV); and 0-10 mol % of structural unit E of formula (V).

10. A polymer according to claim 1 comprising from 20-80 mol % of structural unit A of formula (I).

11. A polymer according to claim 1 comprising from 15-70 mol % of structural unit B of formula (II).

12. A polymer according to claim 1 comprising from 0-20 mol % of structural unit D of formula (IV).

13. A polymer according to claim 12 comprising from 20-80 mol % of structural unit A of formula (I) and from 15-70 mol % of structural unit B for formula (II).

14. A polymer according to claim 1 wherein at least 15% of the side groups are cleaved at a pH higher than 12.5 at 22° C. within 2 hours.

15. A mortar, concrete or cementitious binder comprising a polymer according to claim 1.

16. A mortar, concrete or cementitious binder comprising a polymer according to claim 4.

17. A mortar, concrete or cementitious binder comprising a polymer according to claim 13.

18. The polymer of claim 2, wherein 5 mol % to 100 mol % of R2 are represented by $(R7O)_z R8$.

19. A polymer comprising side chains connected to the backbone of the polymer by at least one of an ester group, an amide group, an imide group, or combinations thereof, wherein at least 10 weight percent can be cleaved in alkaline medium at a pH of from 8-14 at 20° C., wherein the polymer comprises:

a mol % of structural unit A of formula (I)

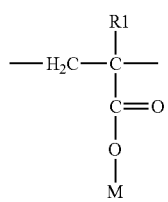

b mol % of structural unit B of formula (II)

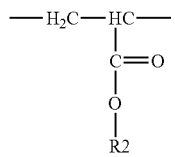

c mol % of structural unit C of formula (III)

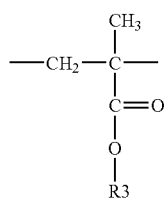

d mol % of structural unit D of formula (IV) and

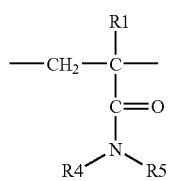

e mol % of structural unit E of formula (V)

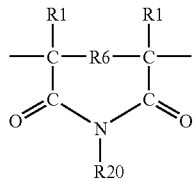

wherein each R1 independently represents a hydrogen atom, a methyl group, or a mixture thereof;

wherein M represents a hydrogen atom, a metallic cation, an ammonium or organic ammonium cation, or a mixture thereof;

wherein R2, R20 and R3 independently from each other represent a $C_1$-$C_{12}$ alkyl- or cycloalkyl group, a $C_2$-$C_{12}$ hydroxyalkyl group or $(R7O)_z R8$, or mixtures thereof, wherein O represents an oxygen atom, R7 represents a $C_2$-$C_3$ alkylene group or mixtures thereof, R8 represents a hydrogen atom, a $C_{1-12}$ alkyl- or cycloalkyl group, a $C_2$-$C_{12}$ hydroxyalkyl group, or an unsubstituted or substituted aryl group, and z represents a number from 1-250;

wherein at least one of R4 and R5 represents a hydrogen atom or a substituent as defined for R2, and R4 and R5 may form together a ring structure of which N is part of, this ring structure may further contain other hetero atoms like another nitrogen, sulfur or oxygen atom, or mixtures thereof, and wherein at least one of R4 and R5 represents $-(A^1O)_x-(B^1O)_y-R9$, wherein O represents an oxygen atom, $A^1 \neq B^1$ and represent independently from each other a $C_2$-$C_3$ alkylene group, R9 represents a hydrogen atom, a $C_1$-$C_{12}$ alkyl- or cycloalkyl group, a $C_2$-$C_{12}$ hydroxyalkyl group, or an unsubstituted or substituted aryl group, x represents a number from 1-250, y represents a number from 0-250, and x+y is from 1-250;

wherein R6 is a single bond or a methylene group, and wherein a, b, c, d and e represent numbers where the sum of a+b+c+d+e=100 and b is a number from 10-90, c is a number from 0-85, d is a number from 0-50, e is a number from 0-10, a=100−(b+c+d+e) and is at least 5, and wherein the sum of e and d is a value of more than 0.

20. The polymer of claim 19, wherein 5 mol % to 100 mol % of R2 are represented by $(R7O)_z R8$.

21. The polymer of claim 20, wherein the sum of e and d is between 0.01 and 50.

22. A polymer comprising side chains connected to the backbone of the polymer by at least one of an ester group, an amide group, an imide group, or combinations thereof, wherein at least 10 weight percent can be cleaved in alkaline medium at a pH of from 8-14 at 20° C., wherein the polymer comprises:

a mol % of structural unit A of formula (I)

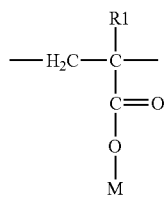

I b mol % of structural unit B of formula (II)

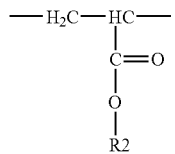

II c mol % of structural unit C of formula (III)

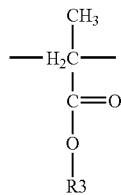

III d mol % of structural unit D of formula (IV) and

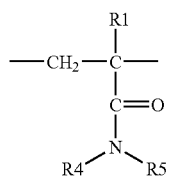

IV e mol % of structural unit E of formula (V)

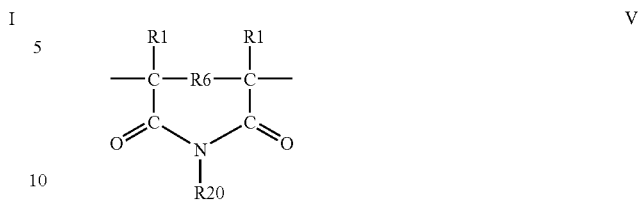

V wherein each R1 independently represents a hydrogen atom, a methyl group, or a mixture thereof;

wherein M represents a hydrogen atom, a metallic cation, an ammonium or organic ammonium cation, or a mixture thereof;

wherein R2 and R3 independently from each other represent a $C_1$-$C_{12}$ alkyl- or cycloalkyl group or $(R7O)_zR8$, or mixtures thereof, wherein O represents an oxygen atom, R7 represents a $C_2$-$C_3$ alkylene group or mixtures thereof, R8 represents a hydrogen atom, and z represents a number from 1-250;

wherein R4 and R5 each independently represent a hydrogen atom or a substituent as defined for R2, and R4 and R5 may form together a ring structure of which N is part of, this ring structure may further contain other hetero atoms like another nitrogen, sulfur or oxygen atom, or mixtures thereof wherein R6 is a single bond or a methylene group;

wherein R20 represents a $C_1$-$C_{12}$ alkyl- or cycloalkyl group, a $C_2$-$C_{12}$ hydroxyalkyl group or $(R7O)_zR8$, or mixtures thereof, wherein O represents an oxygen atom, R7 represents a $C_2$-$C_3$ alkylene group or mixtures thereof, R8 represents a hydrogen atom, a $C_{1-12}$ alkyl- or cycloalkyl group, a $C_2$-$C_{12}$ hydroxyalkyl group, or an unsubstituted or substituted aryl group, and z represents a number from 1-250; and wherein a, b, c, d and e represent numbers where the sum of a+b+c+d+e=100 and b is a number from 10-90, c is a number from 0-85, d is a number from 0-50, e is a number from 0-10, a=100−(b+c+d+e) and is at least 5, and wherein the sum of e and d is a value of more than 0.

23. The polymer of claim 22, wherein 5 mol % to 100 mol % of R2 are represented by $(R7O)_zR8$, and wherein the sum of e and d is between 0.01 and 50.

* * * * *

UNITED STATES PATENT AND TRADEMARK OFFICE
CERTIFICATE OF CORRECTION

PATENT NO.       : 7,375,163 B2
APPLICATION NO.  : 11/329233
DATED            : May 20, 2008
INVENTOR(S)      : Irene Schober et al.

It is certified that error appears in the above-identified patent and that said Letters Patent is hereby corrected as shown below:

Col. 14, Ln 26-33 in Claim 1, Formula (IV) should be deleted and replaced with the following Formula (IV):

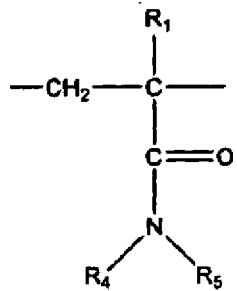

Col. 19, Ln 27-34 in Claim 22, Formula (III) should be deleted and replaced with the following Formula (III):

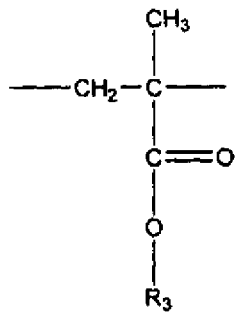

Signed and Sealed this

Fourteenth Day of October, 2008

JON W. DUDAS
*Director of the United States Patent and Trademark Office*